United States Patent
Liu et al.

(10) Patent No.: US 10,144,244 B2
(45) Date of Patent: Dec. 4, 2018

(54) AUTOMATIC CARVING DEVICE FOR WHEEL

(71) Applicant: CITIC Dicastal CO., LTD, Qinhuangdao (CN)

(72) Inventors: Weidong Liu, Qinhuangdao (CN); Jiandong Guo, Qinhuangdao (CN)

(73) Assignee: CITIC Dicastal CO., LTD, Qinhuangdao (CN)

( * ) Notice: Subject to any disclaimer, the term of this patent is extended or adjusted under 35 U.S.C. 154(b) by 0 days.

(21) Appl. No.: 15/635,819

(22) Filed: Jun. 28, 2017

(65) Prior Publication Data

US 2018/0001695 A1    Jan. 4, 2018

(30) Foreign Application Priority Data

Jun. 29, 2016 (CN) .......................... 2016 1 0492421

(51) Int. Cl.
| | |
|---|---|
| B44C 1/22 | (2006.01) |
| B23B 7/12 | (2006.01) |
| B23B 5/28 | (2006.01) |
| B60B 3/00 | (2006.01) |
| B23B 31/177 | (2006.01) |

(52) U.S. Cl.
CPC ................ *B44C 1/225* (2013.01); *B23B 5/28* (2013.01); *B23B 7/12* (2013.01); *B23B 31/16258* (2013.01); *B60B 3/00* (2013.01); *B23B 2215/08* (2013.01); *B60B 2310/646* (2013.01); *B60B 2310/648* (2013.01); *B60B 2900/112* (2013.01); *B60B 2900/113* (2013.01)

(58) Field of Classification Search
CPC ....... B23B 7/12; B23B 2215/08; B44C 1/225; B60B 2900/113; B60B 2310/646
See application file for complete search history.

(56) References Cited

U.S. PATENT DOCUMENTS

| | | | |
|---|---|---|---|
| 2008/0196563 A1* | 8/2008 | Sammartin | ........ B23Q 17/2291 82/118 |
| 2015/0273588 A1* | 10/2015 | Bowen | ...................... B23B 5/28 82/104 |
| 2017/0312834 A1* | 11/2017 | Guo | ...................... B23B 31/302 |

* cited by examiner

*Primary Examiner* — Sara Addisu
(74) *Attorney, Agent, or Firm* — Maier & Maier, PLLC

(57) ABSTRACT

An automatic carving device for a wheel, including a rack, a chassis, a lifting cylinder, brackets, bearing blocks, linear bearings, mounting plates, guide shafts, a lifting shaft, a servo motor, a synchronous pulley, a connection plate, a synchronous belt, a synchronous pulley, a pedestal, a connection shaft, a servo motor, a shaft sleeve, a lower end cover, a connection shaft, a shaft sleeve, and an oil cylinder. The automatic carving device for the wheel can automatically carve characters on the wheel, meanwhile it also has the characteristics of simple structure, convenience for manufacturing, stable performance and high precision that can meet the machining requirement, and can also meet the requirement of automatic production.

2 Claims, 2 Drawing Sheets

AUTOMATIC CARVING DEVICE FOR WHEEL

TECHNICAL FIELD

The present invention relates to a machining device, in particular to an automatic carving device during a wheel machining process.

BACKGROUND ART

During the machining process of an automobile wheel, after the machining of the wheel is completed, corresponding text information needs to be carved at different positions of an outer rim of the wheel, for adding traceability of the wheel. At present, wheel manufacturing enterprises usually adopt two ways including pneumatic carving and laser carving, which have the problem that the two carving ways are low in efficiency, large in amount of labor and unclear in carved characters. The present invention introduces a full-automatic online carving device which is efficient and clear in carved characters.

SUMMARY OF THE INVENTION

An objective of the present invention is to provide an automatic carving device for a wheel.

To achieve the object described above, a technical solution of the present invention is as follows: an automatic carving device for a wheel is mainly composed of a rack, a chassis, a lifting cylinder, brackets A, bearing seats, linear bearings, mounting plates, guide shafts, a lifting shaft, a servo motor A, a synchronous pulley A, a connection plate, a synchronous belt, a synchronous pulley B, a pedestal, a connection shaft A, a servo motor B, a shaft sleeve A, a lower end cover, a connection shaft B, a shaft sleeve B, an oil cylinder, bearings A, end covers, a gland, bearings B, a lower plate, an upper flange plate, pin rolls, springs, sliding petals, a connection shaft C, a protecting cover, an conical core, a servo motor C, a lead screw A, a linear guide rail A, a sliding rack, a linear guide rail B, a lead screw B, a servo motor D, a sliding rack B 42, a runout detector 43, a detection roll 44, and a bracket B 45. The chassis 2 and the bracket B 45 are fixed on the rack 1, the mounting plates are fixed on the chassis via the brackets A, the bearing seats are fixed on the mounting plates, the lifting shaft is installed on the bearing seats via the linear bearings, two ends of the lifting shaft are connected with the connection plate and an output shaft of the lifting cylinder respectively, the servo motor A and the pedestal are fixed on the connection plate, the shaft sleeve A is installed on the pedestal via the bearings A and the end covers, the synchronous pulley A is connected with an output shaft of the servo motor A, the synchronous pulley B is connected with the connection shaft A. and the synchronous belt is connected with the synchronous pulley A and the synchronous pulley B, respectively.

The lower end cover, the gland and the lower plate are fixed on the shaft sleeve A, the servo motor B is installed at the lower end cover, the shaft sleeve B is installed on the shaft sleeve A via the bearings B and the gland, the oil cylinder is fixed in the shaft sleeve B, an output end of the oil cylinder is connected with the connection shaft C, the service motor B is connected with the shaft sleeve B via the connection shaft B, the conical core is connected with the shaft sleeve B via the connection shaft C, the conical core, the connection shaft C and the shaft sleeve B are circumferentially locked without relative rotation, the connection shaft C and the shaft sleeve B can relatively move axially, the upper flange plate is fixed on the lower plate, eight uniformly distributed T-shaped sliding chutes are formed in an inner cavity of the upper flange plate and the lower plate, bottom surfaces of the eight sliding pedals are in one-to-one correspondence with the eight T-shaped sliding chutes respectively, the sliding pedals can slide smoothly in the sliding chutes with high precision, the inner side wall of each sliding pedal is a slope of 15 degrees relative to a vertical axis of the device, and two ends of each of the eight springs are connected with the upper flange plate and the corresponding sliding pedal respectively; side surfaces of the conical core comprise two sets of slopes of 15 degrees relative to the vertical axis which are uniformly distributed at intervals, the number of slopes in each set is eight, the two slopes have a height difference, side walls of the upper ends of the two sets of slopes join at a conical surface, under the combined effect of the tensile force of the oil cylinder and the elastic force of the springs, when the conical core is placed at a bottommost position, side walls of the conical pedals contact the conical surface of the conical core, the servo motor B drives the conical core via the connection shaft C, the shaft sleeve B and the connection shaft C to rotate 22.5 degrees around the vertical axis, and the conical pedals are matched with the slopes and can convert between the two sets of uniformly spaced slopes of the conical core. The oil cylinder drives the connection shaft C and the conical core to move up and down, by the slope cooperation of the conical pedals and the slopes of the conical core, the eight sliding synchronously move centripetally and centrifugally along the eight uniformly distributed T-shaped sliding chutes formed in the inner cavity of the upper flange plate and the lower plate, and thereby the eight sliding pedals achieves the high-precision synchronous expanding and shrinking function; as the two sets of uniformly spaced slopes of the side surfaces of the conical core have the height difference, the servo motor B drives the core to rotate 22.5 degrees around the vertical axis, the sliding pedals are matched with the slopes and can convert between the two sets of uniformly spaced slopes of the conical core, and thereby the expanding and shrinking diameter of the pedals changes within two different ranges, and finally the sliding pedals achieve large-stroke expanding and shrinking.

The lower plate and the upper flange plate are provided with corresponding pin holes, and the pin rolls are connected with the pin holes of the lower plate and the upper flange plate respectively, thus ensuring the assembly precision of the lower plate and the upper flange plate.

The servo motor C and the linear guide rail A are fixed on the mounting bracket, the lead screw A is connected with the sliding rack A and the servo motor C, the servo motor C can drive the sliding rack A via the lead screw A to move up and down along the linear guide rail A; the linear guide rail B and the servo motor D are fixed on the sliding rack A, the lead screw B is connected with the sliding rack B and the servo motor D, a runout detector is installed on the sliding rack B, a detection roll is installed on the runout detector, the servo motor D can drive the sliding rack B, the runout detector and the sliding rack B via the lead screw B to move left or right along the linear guide rail B.

When in actual use, a wheel is conveyed to a working position of the device via a roller way, compressed air is fed, the lifting cylinder drives a clamping mechanism to raise, the flange surface of the wheel contacts the upper flange plate, and then the lifting cylinder lifts the wheel to a specified position. An oil cylinder rod of the oil cylinder is in a shrunk state, and under the effect of the springs, the slopes of the sliding pedals contact the upper conical surface of the core. According to the size of the center hole diameter of the wheel, by rotating the conical core for a specific angle under the driving of the servo motor A, the slopes of the sliding pedals are matched with the corresponding slopes of the conical core, then the oil cylinder starts operation, the oil cylinder overcomes the elastic force of the springs to drive the connection shaft B and the conical core to move upwards, by the slope cooperation of the conical pedals and the slopes of the conical core, each sliding pedal synchronously moves towards the outer side along the eight uniformly distributed T-shaped sliding grooves formed in the inner cavity of the upper flange plate and the lower plate, and finally the sliding pedals contact a center hole of the wheel, and the positioning and expanding process of the wheel is completed. According to various size parameters for machining the wheel, under the control of the servo motor C and the servo motor D, the carving knife holder and the carving knife move to a carving position of an outer rim of the wheel, then the servo motor A drives the wheel to rotate, meanwhile, the carving knife holder controls the carving knife to carve characters on the outer rim of the wheel, and via controlling the rotation speed of the servo motor A, the carving knife holder completes the circumferential carving work of the outer rim of the wheel.

The present invention can meet the requirement of carving the characters on the wheel, meanwhile has the characteristics of simple structure, convenience for manufacturing, stable performance and high precision that can meet the machining requirement, and can also meet the requirement of automatic production.

Figure 1:
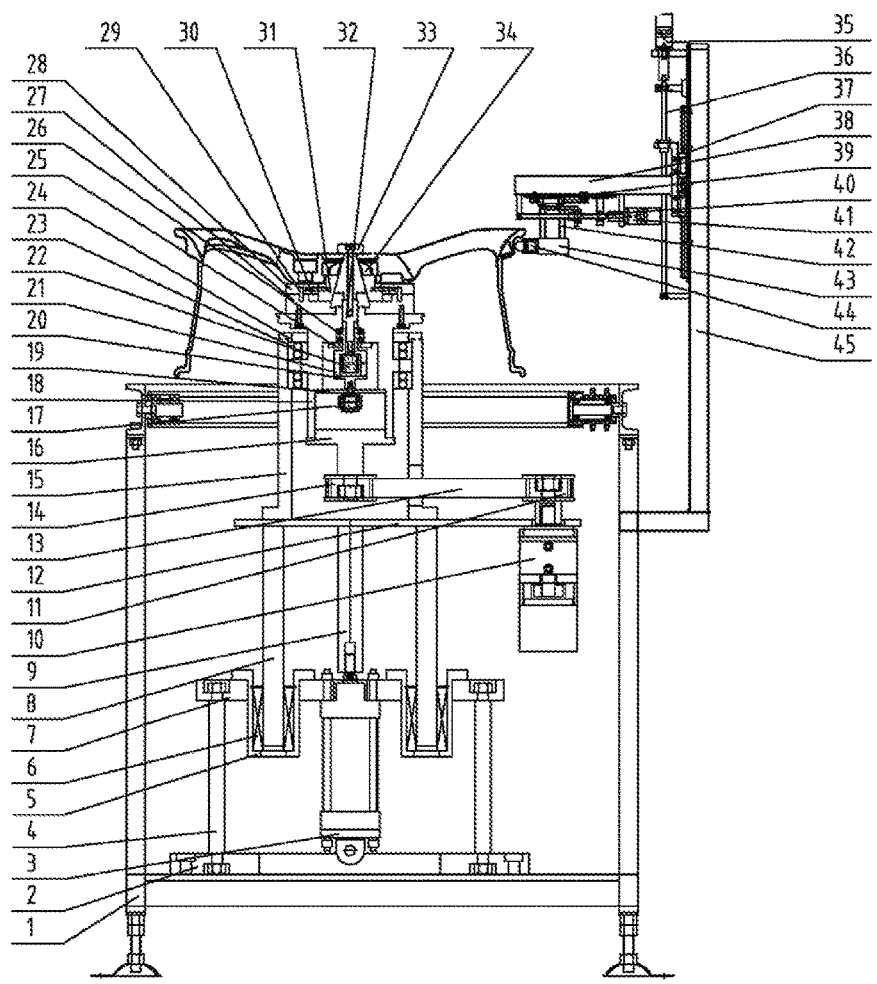
FIG. 1 is a structural schematic diagram of an automatic carving device for a wheel provided by the present invention.
Figure 2:
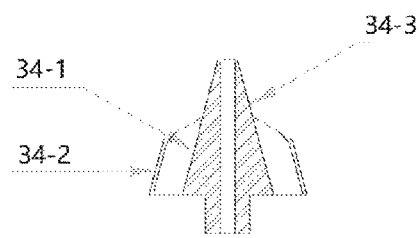
FIG. 2 is a structural schematic diagram of a conical core in an automatic carving device for a wheel provided by the present invention.
Figure 3:
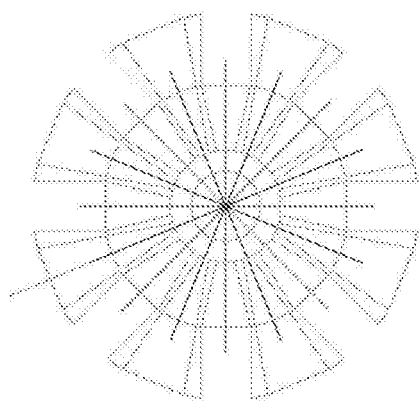
FIG. 3 is a structural schematic diagram of a conical core in an automatic carving device for a wheel provided by the present invention.

In the figures, 1—rack, 2—chasis, 3—lifting cylinder, 4—bracket A, 5—bearing seats, 6—linear bearing, 7—mounting plate, 8—guide shaft, 9—lifting shaft, 10—servo motor A, 11—synchronous pulley A, 12—connection plate, 13—synchronous belt. 14—synchronous pulley B, 15—pedestal, 16—connection shaft A. 17—servo motor B, 18—shaft sleeve A, 19—lower end cover, 20—connection shaft B, 21—shaft sleeve B, 22—oil cylinder, 23—bearing A, 24—end cover, 25—gland, 26—bearing B, 27—lower plate, 28—upper flange plate, 29—pin roll, 30—spring, 31—sliding petal, 32—connection shaft B, 33—protecting cover, 34—conical core, 35—servo motor C, 36—lead screw A, 37—linear guide rail A. 38—sliding rack A, 39—linear guide rail B, 40—lead screw B, 41—servo motor D, 42—sliding rack A, 43—carving knife holder, 44—carving knife, and 45—bracket B.

DETAILED DESCRIPTION OF THE INVENTION

In the following, the details and working conditions of a specific device provided by the present invention are described in combination with the figures.

An automatic carving device for a wheel provided by the invention is composed of a rack 1, a chassis 2, a lifting cylinder 3, brackets A 4, bearing seats 5, linear bearings 6, mounting plates 7, guide shafts 8, a lifting shaft 9, a servo motor A 10, a synchronous pulley A 11, a connection plate 12, a synchronous belt 13, a synchronous pulley B 14, a pedestal 15, a connection shaft A 16, a servo motor B 17, a shaft sleeve A 18, a lower end cover 19, a connection shaft B 20, a shaft sleeve B 21, an oil cylinder 22, bearings A 23, end covers 24, a gland 25, bearings B 26, a lower plate 27, an upper flange plate 28, pin rolls 29, springs 30, sliding petals 31, a connection shaft C 32, a protecting cover 33, a conical core 34, a servo motor C 35, a lead screw A 36, a linear guide rail A 37, a sliding rack 38, a linear guide rail B 39, a lead screw B 40, a servo motor D 41, a sliding rack B 42, a carving knife holder 43, a carving knife 44, and a bracket B 45. The chassis 2 and the bracket B 45 are fixed on the rack 1, the mounting plates 7 are fixed on the chassis 2 via the brackets A 4, the bearing seats 5 are fixed on the mounting plates 7, the lifting shaft 9 is installed on the bearing seats 5 via the linear bearings 6, two ends of the lifting shaft 9 are connected with the connection plate 12 and an output shaft of the lifting cylinder 3 respectively, the servo motor A 10 and the pedestal 15 are fixed on the connection plate 12, the shaft sleeve A 18 is installed on the pedestal 15 via the bearings A 23 and the end covers 24, the synchronous pulley A 11 is connected with an output shaft of the servo motor A 10, the synchronous pulley B 14 is connected with the connection shaft A 16, and the synchronous belt 13 is connected with the synchronous pulley A 11 and the synchronous pulley B 14, respectively.

The lower end cover 19, the gland 25 and the lower plate 27 are fixed on the shaft sleeve A 18, the servo motor B 17 is installed at the lower end cover 19, the shaft sleeve B 21 is installed on the shaft sleeve A 18 via the two rows of bearings B 26 and the gland 25, the oil cylinder 22 is fixed in the shaft sleeve B 21, an output end of the oil cylinder 22 is connected with the connection shaft C 32, the servo motor B 17 is connected with the shaft sleeve B 21 via the connection shaft B 20, the conical core 34 is connected with the shaft sleeve B 21 via the connection shaft C 32, the conical core 34, the connection shaft C 32 and the shaft sleeve B 21 are circumferentially locked without relative rotation, the connection shaft C 32 and the shaft sleeve B 21 can relatively move axially, the upper flange plate 28 is fixed on the lower plate 27, eight uniformly distributed T-shaped sliding chutes are formed in an inner cavity of the upper flange plate 28 and the lower plate 27, bottom surfaces of the eight sliding pedals 31 are T-shaped structures respectively matched and in one-to-one correspondence with the eight T-shaped sliding chutes, the sliding pedals 31 can slide smoothly in the sliding chutes with high precision, the inner side wall of each sliding pedal 31 is a slope of 15 degrees relative to the vertical axis of the device, and two ends of each of the eight springs 30 are connected with the upper flange plate 28 and the corresponding sliding pedal 31 respectively; side surfaces of the conical core 34 comprise two sets of slopes 34-1 and slopes 34-2 of 15 degrees relative to the vertical axis of the device which are uniformly distributed at intervals, the number of slopes in each set is eight, two slopes have a height difference, side walls of the upper ends of the two sets of slopes join at a conical surface 34-3, under the combined effect of the tensile force of the oil cylinder 22 and the elastic force of the springs 30, when the conical core 34 is placed at a bottommost position, side walls of the sliding pedals 31 contact the conical surface 34-3 of the conical core 34, the servo motor B 17 drives the conical core 34 via the connection shaft B 20, the shaft sleeve B 21 and the connection shaft C 32 to rotate 22.5 degrees around the vertical axis, and the sliding pedals 31 are matched with the slopes and can convert between the slopes 34-1 and 35-2 of the conical core 34. The oil cylinder 22 drives the connection shaft C 32 and the conical core 34 to move up and down, by the slope cooperation of the sliding pedals 31 and the slopes of the conical core 34, the eight sliding pedals 31 synchronously move centripetally and centrifugally along the eight uniformly distributed T-shaped sliding chutes formed in the inner cavity of the upper flange plate 28 and the lower plate 27, and thereby the eight sliding pedals 31 achieves the high-precision synchronous expanding and shrinking function; as the two sets of uniformly spaced slopes of the side surfaces of the conical core 34 have the height difference, the servo motor B 17 drives the conical core 34 to rotate 22.5 degrees, the sliding pedals 31 are matched with the slopes and can convert between the slopes 34-1 and 34-2 of the conical core 34, and thereby the expanding and shrinking diameter of the pedals 31 changes within two different ranges, and finally the sliding pedals achieve large-stroke expanding and shrinking.

The lower plate 27 and the upper flange plate 28 are provided with corresponding pin holes, and the pin rolls 29 are connected with the pin holes of the lower plate 27 and the upper flange plate 28 respectively, thus ensuring the assembly precision of the lower plate 27 and the upper flange plate 28.

The servo motor C 35 and the linear guide rail A 37 are fixed on the mounting bracket 45, the lead screw A 36 is connected with the sliding rack A 38 and the servo motor C 35, the servo motor C 35 can drive the sliding rack A 38 via the lead screw A 36 to move up and down along the linear guide rail A 37; the linear guide rail B 39 and the servo motor D 41 are fixed on the sliding rack A 38, the lead screw B 40 is connected with the sliding rack B 42 and the servo motor D 41, a runout detector 43 is installed on the sliding rack B 42, a detection roll 44 is installed on the runout detector 43, the servo motor D 41 can drive the sliding rack B 42, the runout detector 43 and the sliding rack B 42 via the lead screw B 40 to move left or right along the linear guide rail B 39.

When in actual use, a wheel is conveyed to a working position of the device via a roller way, compressed air is fed, the lifting cylinder 3 drives a clamping mechanism to raise, the flange surface of the wheel contacts the flange plate 28, and then the lifting cylinder 3 lifts the wheel to a specified position. An oil cylinder rod of the oil cylinder 22 is in a shrunk state, and under the effect of the springs 30, the slopes of the sliding pedals 31 contact the upper conical surface of the core 34. According to the size of the center hole diameter of the wheel, by rotating the conical core 34 for a specific angle under the driving of the servo motor A 10, the slopes of the sliding pedals 31 are matched with the corresponding slopes of the conical core 34, then the oil cylinder 22 starts operation, the oil cylinder 22 overcomes the elastic force of the springs 30 to drive the connection shaft C 32 and the conical core 34 to move upwards, by the slope cooperation of the sliding pedals 31 and the slopes of the conical core 33, each sliding pedal 31 synchronously moves towards the outer side along the eight uniformly distributed T-shaped sliding grooves formed in the inner cavity of the upper flange plate 28 and the lower plate 27, and finally the sliding pedals 31 contact a center hole of the wheel, and the positioning and expanding process of the wheel is completed. According to various size parameters for machining the wheel, under the control of the servo motor C 35 and the servo motor D 41, the carving knife holder 43 and the carving knife 44 move to a carving position of an outer rim of the wheel, then the servo motor A 10 drives the wheel to rotate, meanwhile, the carving knife holder 43 controls the carving knife to carve characters on the outer rim of the wheel, and via controlling the rotation speed of the servo motor A 10, the carving knife holder 43 completes the circumferential carving work of the outer rim of the wheel.

The invention claimed is:

1. An automatic carving device for a wheel, comprising: a rack, a chassis, a lifting cylinder, brackets A, bearing seats, linear bearings, mounting plates, guide shafts, a lifting shaft, a servo motor A, a synchronous pulley A, a connection plate, a synchronous belt, a synchronous pulley B, a pedestal, a connection shaft A, a servo motor B, a shaft sleeve A, a connection shaft B, a shaft sleeve B, an oil cylinder, bearings A, end covers, a gland, bearings B, a lower plate, an upper flange plate, pin rolls, springs, sliding petals, a connection shaft C, a protecting cover, a conical core, a servo motor C, a lead screw A, a linear guide rail A, a sliding rack A, a linear guide rail B, a lead screw B, a servo motor D, a sliding rack B, a carving knife holder, a carving knife, and a bracket B;

wherein the chassis and the bracket B are fixed on the rack, the mounting plates are fixed on the chassis via the brackets A, the bearing seats are fixed on the mounting plates, the lifting shaft is installed on the bearing seats via the linear bearings, two ends of the lifting shaft are connected with the connection plate and an output shaft of the lifting cylinder respectively, the servo motor A and the pedestal are fixed on the connection plate, the shaft sleeve A is installed on the pedestal via the bearings A and the end covers, the synchronous pulley A is connected with an output shaft of the servo motor A, the synchronous pulley B is connected with the connection shaft A, and the synchronous belt is connected with the synchronous pulley A and the synchronous pulley B, respectively;

wherein the lower plate is fixed on an upper end of the shaft sleeve A, the shaft sleeve B is installed on the shaft sleeve A via the bearings B and the gland, the oil cylinder is fixed in the shaft sleeve B, an output end of the oil cylinder is connected with the connection shaft B, the servo motor B is connected with the shaft sleeve B via the connection shaft B, the conical core is connected with the shaft sleeve B via the connection shaft C, the conical core, the connection shaft C and the shaft sleeve B are circumferentially locked without relative rotation, the connection shaft C and the shaft sleeve B can relatively move axially, the upper flange plate is fixed on the lower plate so that eight uniformly distributed T-shaped sliding chutes are formed in an inner cavity enclosed by the upper flange plate and the lower plate, each bottom of the eight sliding pedals is T-shaped to fit in one of the eight T-shaped sliding chutes, the sliding pedals can slide smoothly in the sliding chutes, the inner side wall of each sliding pedal is a slope of 15 degrees relative to a vertical axis of the device, and two ends of each of the eight springs are connected with the upper flange plate and the corresponding sliding pedal respectively; outer side surfaces of the conical core comprise two sets of slopes and the slopes of 15 degrees relative to the vertical axis are uniformly and circumferentially distributed at intervals, the number of slopes of the conical core in each set is eight, two sets of the slopes have a height difference in a direction orthogonal to the vertical axis, side walls of the upper ends of the two sets of slopes join at a conical surface, when the conical core is placed at a lowest position, the inner side walls of the sliding pedals contact the conical surface of the conical core, the servo motor B drives the conical core via the connection shaft B, shaft sleeve B and the connection shaft C rotate 22.5 degrees around the vertical axis, so that when the conical core is driven from the lowest position to a highest position, the inner side walls of the sliding pedals will sequentially contact the conical surface, the set of slopes with a smaller height, and the set of slopes with a larger height; the expanding re; the oil cylinder drives the connection shaft C and the conical core to move up and down, by the slope cooperation of the sliding pedals and the conical core, the eight sliding pedals synchronously move centripetally and centrifugally along the eight uniformly distributed T-shaped sliding chutes; and wherein the servo motor C and the linear guide rail A are fixed on the mounting bracket, the lead screw A is connected with the sliding rack A and the servo motor C, the servo motor C can drive the sliding rack A via the lead screw A to move up and down along the linear guide rail A; the linear guide rail B and the servo motor D are fixed on the sliding rack A, the lead screw B is connected with the sliding rack B and the servo motor D, the carving holder is installed on the sliding rack B, the carving knife is installed on the carving holder, the servo motor D can drive the sliding rack B, the carving holder and the sliding rack B via the lead screw B to move left or right along the linear guide rail B.

2. The automatic carving device for the wheel according to claim 1, wherein the lower plate and the upper flange plate are provided with corresponding pin holes, and the pin rolls are connected with the pin holes of the lower plate and the upper flange plate respectively.

\* \* \* \* \*